(12) United States Patent
Wu

(10) Patent No.: US 7,032,175 B2
(45) Date of Patent: Apr. 18, 2006

(54) COLLISION-FREE IDEOGRAPHIC CHARACTER CODING METHOD AND APPARATUS FOR ORIENTAL LANGUAGES

(76) Inventor: Ching-Shyan Wu, No. 417, 14th Floor, Suite 8 DaShuen Second Road, SaMin Chiu, Kaohsiung (TW)

( * ) Notice: Subject to any disclaimer, the term of this patent is extended or adjusted under 35 U.S.C. 154(b) by 563 days.

(21) Appl. No.: 10/354,428

(22) Filed: Jan. 30, 2003

(65) Prior Publication Data

US 2004/0155882 A1    Aug. 12, 2004

(51) Int. Cl.
*G06F 17/21*    (2006.01)

(52) U.S. Cl. .......................... 715/535; 382/185; 341/28

(58) Field of Classification Search ..................... None
See application file for complete search history.

(56) References Cited

U.S. PATENT DOCUMENTS

| | | | | |
|---|---|---|---|---|
| 5,109,352 A | * | 4/1992 | O'Dell et al. | 715/542 |
| 5,131,766 A | * | 7/1992 | Wong | 715/535 |
| 5,212,769 A | * | 5/1993 | Pong | 715/535 |
| 5,475,767 A | * | 12/1995 | Du | 382/185 |
| 5,724,031 A | * | 3/1998 | Huang | 715/535 |
| 5,923,778 A | * | 7/1999 | Chen et al. | 382/185 |
| 6,003,049 A | * | 12/1999 | Chiang | 715/535 |
| 2004/0239534 A1 | * | 12/2004 | Kushler et al. | 341/28 |

OTHER PUBLICATIONS

Chan, Chorkin; A Chinese Characters Coding Scheme for Computer Input and Internal Storage; International Conference On Computational Linguistics—Proceedings of the 8th conference on Computational linguistics, pp. 274-278 (Tokyo, © 1980).*

Hsu, S.C.; A Flexible Chines Character Input Scheme; Symposium on User Interface Software and Technology—Proceedings of the 4th annual ACM symposium on User interface software and technology, pp. 195-200 (Hilton Head, South Carolina, © 1991).*

Shi, Daming, et al.; Offline Handwritten Chinese Character Recognition by Radical Decomposition; ACM Transcactions on Asian Language Information Processing (TALIP) —vol. 2, Issue 1, pp. 27-48 (© Mar. 2003).*

* cited by examiner

*Primary Examiner*—Doug Hutton
(74) *Attorney, Agent, or Firm*—Marcus G. Theodore

(57) ABSTRACT

A method and apparatus for representing sets of Chinese or Asian characters having complicated and basic ideographic symbols in collision free combinations of English letters to provide one-code-one-character ideographic character coding.

15 Claims, 9 Drawing Sheets

| | |
|---|---|
| A | 八 宀 {甬-用}=マ {貝-目}=ハ {肉-冂}=久 |
| B | 乃 亠 {邪-牙}=阝 {限-艮}=阝 |
| C | 匚 匸 {亙-ユ}=亡 {舛-夕}=屮 {正-卜}=工 |
| D | 已 {亙-一}=凸 {尸}=尸 {亙-丁}=ユ {巨-二}=ㅂ {巨-匚}=コ {夬-乀}=ナ |
| E | 王 {虐-虎}=ᴇ {秉-禾}={雪-雨}=⇒ 彐 {乍-丿}=㠯 {凡-儿}=冈 {印-卩}=ᴇ {鼠:sw}=ᶴ |
| F | 夂 {丹-凵}=刀 {北-匕}=丬 {止-⊥}=匕 {后-口}=𠂋 {印-卩}=匚 |
| G | 勹 {万-一}={龜:hd}=力 {身-自}=ノ 戈 |
| H | 廿 {鹿-庇}=⺍ {昔-日}=⺻ {H}=H {苟-句}=丱 |
| I | 工 {手-丿}=扌 {舉-與}=⺽ {丰-丁}=ヰ {打-丁}=扌 |
| J | 丁 丆 {止-匕}=⊥ 虫 |
| K | 六 大 {共-廾}=六 ⺍ {商-岡}=⺌ {首-目}=⺍ {木-丨}=大 |
| L | 乙 习 飞 {几-丿}=乚 {扎-扌}=乚 {亡-亠}=ㄴ {己-匚}=𠃍 {辿-山}=辶 {巴-口}={毛-壬}=乚 |
| M | 宀 冂 月 {舟-⺮}=刀 {雋-隹}=⺆ |
| N | 广 {之-丶}=乙 {⺍}=⺍ 一 |
| O | 口 {淵-氵H}=⺮ |
| P | 尸 夊 夂 |
| Q | 曰 {母-𠂉}=口 {象-氺}=彑 |
| R | 夕 {爪}=⺥ {烏-一}=乌 {咼-冋}=⺩ {及-乀}=ア {足}=⻊ |
| S | 石 {5}=ㄅ {津-丰}=⺮ {丐-卜}=ㄅ {与-丿}=ㄅ |
| T | 丁 ㇁ {女-く}=⺄ {頁-貝}=⺍ |
| U | 凵 中 山 {卯-丿丨}=凵 |
| V | 人 入 {乏-Z}=⺂ {𠂉-毛}=⺁ {食-良}=△ |
| W | 水 氺 {益-皿}=⺍ {雨-一冂}=氺 {犀-尸牛}=⺤ {清-青}=氵 |
| X | 言 {請-青}=訁 |
| Y | {母-口}=⺅ {戈-丶丿}=𠂊 {卜}=卜 {隹-任}=⺮ {豕-万丿}=⺈ 丫 卜 |
| Z | |

Fig. 4 a , Tab. 1(1)

| | | |
|---|---|---|
| | a | 田 {马-一}=马 |
| 34 | b | 匹 匕 目 {丐-弓}={也-七}=匕 |
| | c | 糸 纟 厶 {瓜-八}=厶 {丂-亅}=ㄷ {氏-七}=厂 {四-凵}=⿱ 兀 卩 丩 |
| | d | ⓧ(木) |
| | e | 力 广 三 {非-丿丨}=三 {仁-人}=二 |
| 35 | f | 火 {光-儿}=⺌ {兆-儿}=ㄨ {焘-寿}=灬 丿 {疟-卜七}=厂 {晓-虎}=厂 |
| | g | ⓧ(金) 刀 {留:nw}=ㄣ {狗-句x}=犭 {牙-匚}=ㄐ {豕-一ㄨ}=⺈ {豸-爪}=豸 |
| 21 | h | 开 廾 口 {欠-人}=⺈ {片-⺄}=爿 {草-早}=⺾ {齐:S}=出 {化-亻}=匕 {卤-㐅}=㐅 |
| | i | 丶 小 {肖-月}=⺌ |
| | j | 丨 {了-亅}=一 中 {衤-ㄨ}=礻 |
| 24 | k | 竹 {竺-二}=⺮ 千 {乎-丿}=于 {升-卜}=ヂ {先-兀}=ノ {午-丁}=ㄠ {勿-刀}={ケ}=ク {艮-日}=㐅 |
| 23 | l | 丨 {衣}=衤 {臣-巨}=丨 |
| | m | 月 {炙-火}=夕 {肉}=月 {人^xc}=人 |
| | n | 几 夕 {爪-丨}=爫 {負-貝}={色-巴}={危-厄}=⺈ {召-口}=⺈ |
| 26 | o | 凵 {卍-十}=凵 |
| | p | 丿 {自-目}=ノ {少-小}=ノ 尸 心 {恭-共}=⺗ {情-青}=忄 |
| 27 | q | 日 {同-冂}=⼕ {巴-乚}=㠯 {四-儿}=囗 {卯-卩}=卩 {尚-口}=丹 {党-兄}=⺍ |
| | r | 丶 {宀-乚}=宀 儿 {川-丨}=丿 {曲-日}=丨 {尖-小}=丶 |
| 36 | s | 十 {寸-丶}=丁 {皮-夂}=廾 |
| | t | ⓧ(土) 士 七 {也-b}=七 {世-廿}=乜 |
| 25 | u | 立 乂 {祭:ne}=ㄨ {片-冂}=⺄ |
| | v | 丿 {ソ}=丷 {戌-戈}=ㄴ 乙 ㄑ 女 {鼠:se}=乚 {与-5}=丿 |
| | w | 幺 么 {幺-丶}=乡 {鄉-郎}=乡 {幸-土}=㞢 {关-八}=关 {米-十}=火 {卤-卤}=⺀ {ソ}=丷 {皿-冂}=皿 |
| | x | {左-工}=ナ {史-中}=㐅 {弋-丶}=弋 {丰-干}=丨 {扌-十}=丨 乂 |
| | Y | {虫-中}=一 {仁-二}=亻 {乞-乙}=⺈ {久-人}=⺈ {班-玨}=丿 {兵-斤}=⺈ |
| | z | |

Fig. 4b, Tab. 1(2)

| CH or CIS | Front Part | OP Type | Rear Part |
|---|---|---|---|
| ... | ... | ... | ... |
| {旗-其}=広 | 方 | . | 广 |
| {穀-禾}=殻 | {壹-亠口}=𠮷 | . | 殳 |
| {兼-丷八}=丱 | コ | # | 廾 |
| {死-一}=歹 | 夕 | . | 匕 |
| {疊-土}=𤴔 | 田 | ^ | xD |
| {炭-山}=灰 | 厂 | @ | 火 |
| {攣-山}=䜌 | 絲 | \ | 言 |
| {晉-日}=㗊 | 二 | / | 从 |
| ... | ... | ... | ... |
| 午 | {午-丁}=𠂉 | # | 丁 |
| 牛 | {先-兀}=𠂉 | # | 十 |
| 米 | 十 | # | {米-十}=八 |
| ... ... | ... | ... | ... |
| 燕 | {燕-北}=燕 | # | 北 |
| 留 | {留-田}=卯 | ! | 田 |
| 肅 | 肀 | # | {淵-氵}=開 |
| 乎 | {乎-丷}=千 | # | 丷 |
| 釆 | 千 | # | {米-十}=八 |
| 東 | 木 | # | 日 |
| 鼎 | 目 | # | {鼎-目}=𠔿 |
| 曲 | 川 | # | 日 |
| 絲 | 糸 | ^ | xC |
| 韋 | {韋-口}=韋 | / | 口 |
| 行 | 彳 | . | 亍 |
| 衛 | 行 | \ | 韋 |
| ... | ... | ... | ... |

Fig. 5, Tab. 2

| Reduced infix notation | Collided Chara. | Reduced code (length < 4) | Frequency of usage | Final Code (unification) |
|---|---|---|---|---|
| ... | ... | ... | ... | ... |
| dQ | 東 | dQ | High | dQ |
| dQ | 杏 | dQ | Low | dQZ |
| dQ | 相 | dQ | Low | dZQ |
| Qs | 早 | Qs | High | Qs |
| Qs | 叶 | Qs | Low | QZs |
| fhK | 粪 | fhK | Low | fhKZ |
| fhK | 烘 | fhK | High | fhK |
| oEs | 昌 | oEs | High | oEs |
| oEs | 唱 | oEs | Low | oZEs |
| LLu | 翌 | LLu | High | LLu |
| LLu | 狸 | LLu | Low | LLZu |
| LSl | 弔 | LSl | Low | LSlZz |
| LSl | 引 | LSl | High | LSl |
| obA | 員 | obA | High | obA |
| obA | 唄 | obA | Low | oZbA |
| HHKm | 碁 | HHKm | Low | HHKmz |
| HHKm | 期 | HHKm | High | HHKm |
| kAjs | 季 | kAjs | High | kAjs |
| kAjs | 秄 | KAjs | Low | KAZjs |
| UBoMo | 嵩 | UBoo | High | UBoo |
| UBoMo | 嵪 | UBoo | Low | UZBoo |
| VqLL | 翁 | VqLL | High | VqLL |
| VqLL | 翎 | VqLL | Low | VqZLL |
| ... | ... | ... | ... | ... |

Fig. 6a, Tab.3(1)

| Reduced infix notation | Collided Chara. | Reduced code (length < 4) | Frequency of usage | Final Code (unification) |
|---|---|---|---|---|
| AA | 穴 | AA | High | AA |
| aa | 畾 | aa | Low | aaZO |
| ... | ... | ... | ... | ... |
| do | 杏 | do | Low | doZz |
| dO | 束 | dO | High | dO |
| ok | 吓 | ok | Low | okZp |
| OK | 因 | OK | High | OK |
| vu | 奴 | vu | High | vu |
| vU | 灿 | vU | Low | vUZT |
| VU | 仚 | VU | Low | VUZr |
| VU | 仚 | VU | Low | VUZV |
| Ahh | 宎 | Ahh | Low | AhhZM |
| ahh | 畔 | ahh | High | ahh |
| put | 怪 | put | High | put |
| PUt | 屈 | PUt | Low | pUtZD |
| fhalMy | 厲 | fhay | High | fhay |
| fhalMy | 燗 | fhay | Low | fhayz |
| fumSEL | 龐 | fuSL | Low | fuSL |
| fumSEL | 爧 | fuSL | High | fuSLz |
| fYftaMw | 爐 | fYtw | High | fYtw |
| fYftaMw | 廬 | fYtw | Low | fYtwN |
| QK | 昦 | QK | Low | QKZx |
| QK | 昗 | QK | Low | QKZz |
| qk | 艮 | qk | High | qk |
| ... | ... | ... | ... | ... |

Fig. 6b, Tab.3(2)

| Reduced infix notation | Collided Chara. | Reduced code (length < 4) | Frequency of usage | Final Code (unification) |
|---|---|---|---|---|
| ... | ... | ... | ... | ... |
| pysqDNp | 德 | pysp | High | pysp |
| pysqDp | 德 | pysp | Low | pyspD |
| jkrqpek | 禮 | jkrk | Low | jkrkp |
| jkrqqK | 禮 | jkrK | High | jkrK |
| VNjhV | 欨 | VjhV | Low | VjhVN |
| VNmljhV | 歈 | VjhV | High | VjhV |
| fMKU | 爛 | fMKU | Low | FMKUl |
| fmkTU | 燿 | fmkU | High | fmkU |
| ffMkTU | 罃 | fMkU | Low | fMkUf |
| gqoa | 鐺 | gqoa | High | gqoa |
| gqobA | 鑌 | gqoA | Low | gqoAb |
| swiKTbA | 類 | sKTA | High | sKTA |
| sMeKTbA | 顛 | sKTA | Low | sKTAM |
| svKTbA | 頬 | sKTA | Low | sKTAv |
| QpqKs | 暐 | Qpqs | Low | QpqsK |
| QpqWs | 暉 | Qpqs | High | Qpqs |
| UyYEMro | 藹 | UyEo | High | UyEo |
| UyYEMro | 檣 | UyEo | Low | UyEop |
| ... | ... | ... | ... | ... |
| VeeHu | 镀 | Veeu | High | Veeu |
| VeElEu | 镂 | VcEu | Low | VeEul |
| VcEMu | 锓 | VeEu | Low | VeEuM |
| VeEsuu | 镊 | VcEu | Low | VeEus |
| ... | ... | ... | ... | ... |

Fig. 6c, Tab.3(3)

COLLISION-FREE IDEOGRAPHIC CHARACTER CODING METHOD AND APPARATUS FOR ORIENTAL LANGUAGES

BACKGROUND OF THE INVENTION

1. Field

The present invention relates to coding of typographic characters, or more particularly, to a method and apparatus for representing each Chinese character using English letters as a reversible code, i.e. a one-code-one-character ideographic character coding.

2. State of the Art

Many coding methods of Chinese characters exist for inputting Asian characters and dictionary indexing. A Chinese character set is composed of a large number of ideographs that represent the characters in the Asian languages. An Asian language may include thousands of characters. For example, the set of the simplified Chinese characters used in Mainland China includes slightly over seven thousand distinct characters. These characters integrate both meaning and pronunciation information. They thus differ from the more purely phonetic writing systems of Western languages. Many consider Chinese characters as overly complex, but in fact they are all derived from a couple hundred simple pictographs and ideographs in ways that are usually quite logical and easy to remember. Keyboards with each key separately representing a Chinese character were bulky and extremely difficult to use. Present reform movements seek to introduce a phonetic alphabet, which would gradually replace Chinese characters in everyday use. However, until this occurs, there remains a need to key code these Chinese characters utilizing conventional keyboards to type and input data.

One conventional computer technique for coding Chinese characters in Asian languages uses the method of radical decomposition. One typical example is described in "Chan-Jei input method" by Acer Systems, Inc. (published by Zu-Lin book company in 1985). In this method, a Chinese character is represented as an ordered sequence of symbols using Chinese basic radical symbols where each symbol is patched upon an English letter on a keyboard randomly. Disadvantages associated with this method are:

First, there is a "collision" problem where one character code representation may correspond to more than one character, so that the produced code cannot be used for indexing.

Second, the limited number of radical symbols used requires a keyboard of special design, which results in unconventional typing input for users familiar with English typing methods.

Third, in order to solve the collision problem, the method requires an ergonometric design of man-machine interaction for the users to pick the desired character from the collided characters displayed on the screen, and thus is not user-friendly.

Fourth, the arrangement of the adopted radical symbols on the keyboard is random. The shape of the selected radical symbols cannot be associated with that of English alphabets, so its application is limited for local use only.

The following method and apparatus generates collision-free character coding for Chinese input and text communication employing conventional keyboards. It also provides means for maintaining characters found in a document or a data base file in a consistent and unique code for communication between different systems having the same coding schemes.

SUMMARY OF THE INVENTION

The present invention provides a method and apparatus for defining each separated group of Asian ideographic symbols to correspond to each English letter on conventionally laid out QWERTY designed alpha numeric keyboards. The invention further provides a method for coding a Chinese character into a character code using predefined ideographic symbols. The Chinese code of the present invention is collision-free, suitable for one-code-one-character Chinese input between the user and a computer and may be used for text character data exchange between different computers.

It thus overcomes the above disadvantages associated with the coding of Chinese or Asian characters to generate collision-free characters. As used herein, each English letter is a subunit of an Asian character code. An Asian character code typically consists of one or more English letters. In collision-free coding, each Asian character is: 1) represented as an ordered sequence of English letters, and 2) generated via a conventional English alpha numeric keyboard such that each Asian character code corresponds to one and only one Asian character. An Asian character set in the oriental language consists of finite number of characters.

Specifically, the method defines a set of basic ideographical symbols, which are used to define more complicated ideographic symbols and characters. The method comprises: first, collecting a whole set of characters of an Asian language under consideration for analysis. Next, a selected character is decomposed, if necessary, into two parts by a predefined operator. Each of these two parts may be further decomposed, if necessary, into two finer parts by another predefined operator. These characters are thus decomposed into a two-branched tree structure, with leaf nodes having the basic ideographic symbols arranged in order of infix notation of the tree structure to represent the character.

Each of the obtained basic ideographic symbols is then assigned to an English letter on keyboard. Generally, this assignment is according to the comparison of either shape, or sound, or common sense, or meaning between the basic ideographic symbol and the English letter so that the decomposition of the character can be easily memorized and identified directly from the English letters.

At this point, the coding by using English letters to define the selected character is completed. The above process is then repeated for another character, until all characters of the Asian language set are represented by the codes of at least one English letter.

In a preferred embodiment of the present invention, the step of decomposing a character or complicated ideographic symbol into its dual nodes is performed by proper selection of some predefined operators. Specifically, there are six types of operators on a conventional alphanumeric keyboard available to decompose characters or complicated ideographic symbols into separable two parts. They are the vertical, horizontal, surrounded, repeated, bound, and connected operator forms. Generally, a type of operator to decompose a character can be instantly determined by the appearance of the character or the way it is written.

If the result of coding of a Chinese character set still produces a few collided characters, in order to obtain a collision-free result, the present invention uses one or more additional English letters to extend the code length, which imparts a final code of collision-free characters. These collided characters are then collected and listed into a table. The table is divided into sub-tables according to the type of collision in the table. The size of the table is relatively small compared with total size of characters considered.

BRIEF DESCRIPTION OF THE DRAWINGS

FIGS. 4a and 4b are a Table 1 set of basic ideographic symbols and their assigned English alphabets of the present invention;

FIG. 5 is a Table 2 listing of the types of operators being used in the decomposition of Chinese characters;

FIGS. 6a, 6b, and 6c is a Table 3 comparison of the code unification process for three categorized collisions to achieve collision-free Chinese code of the present invention.

DESCRIPTION OF THE PREFERRED EMBODIMENT

Figure 1A:
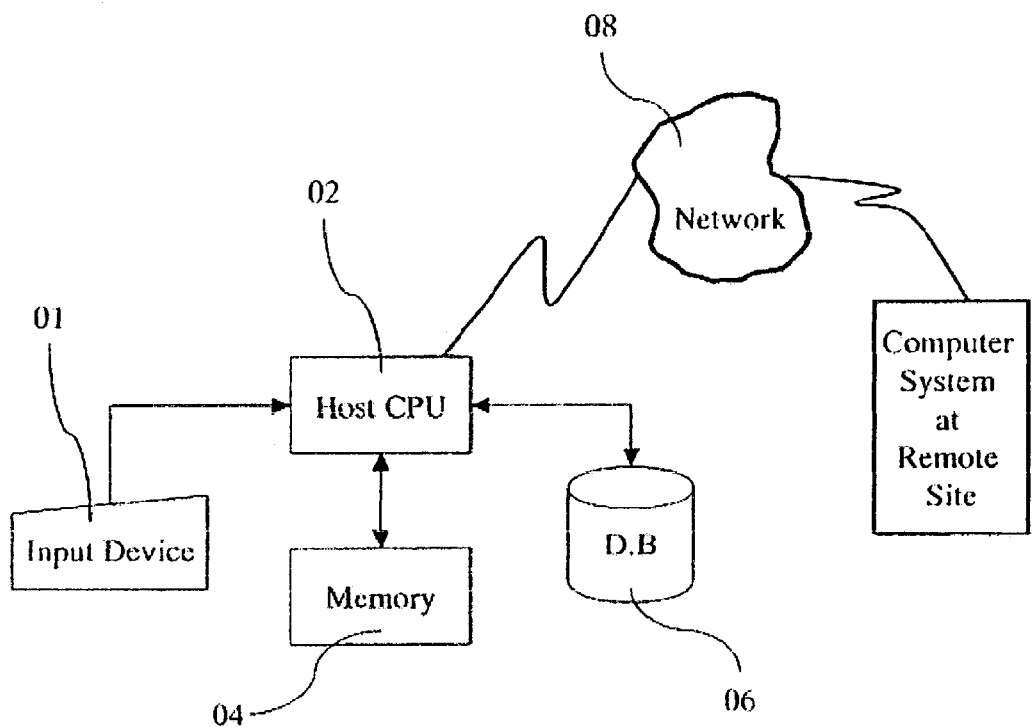
FIGS. 1(a) and 1(b) illustrate a system environment for the implementation of the present invention.
Figure 1B:
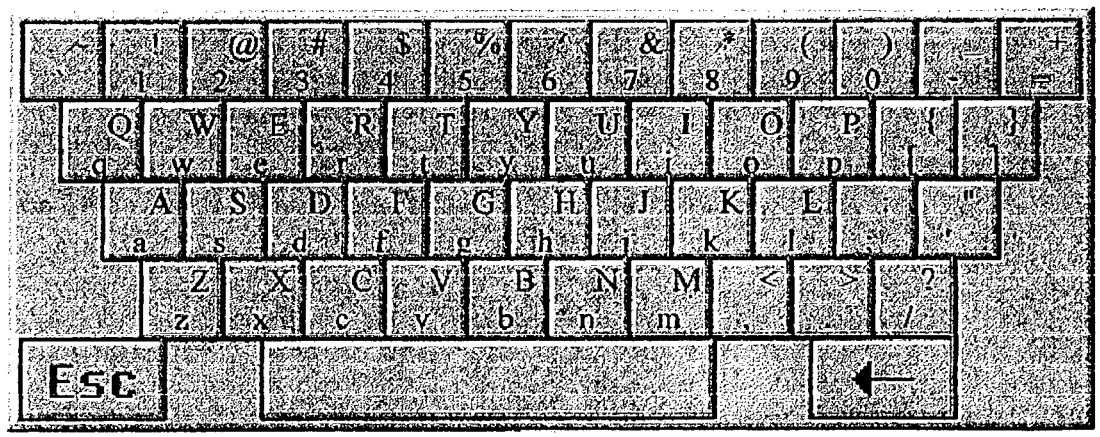

Referring to the illustrated embodiments, FIG. 1(a) shows a computer system environment suitable for the implementation of the present invention. As shown in the figure, Label 01 is an input device, which is typically but not limited to an ordinary keyboard as shown in FIG. 1(b). Label 02 is a host CPU for processing the method of the present invention. Label 04 is a memory for storing the defined basic ideographic tables for the encoding of an oriental character set. Label 06 is a storage device for storing characters and character codes constructed according to the present invention for use in the one-code-one-character indexing purpose. The constructed character codes can be transmitted to another computer system in remote site through the network, as indicated Label 08, for communication purpose.

Figure 2:
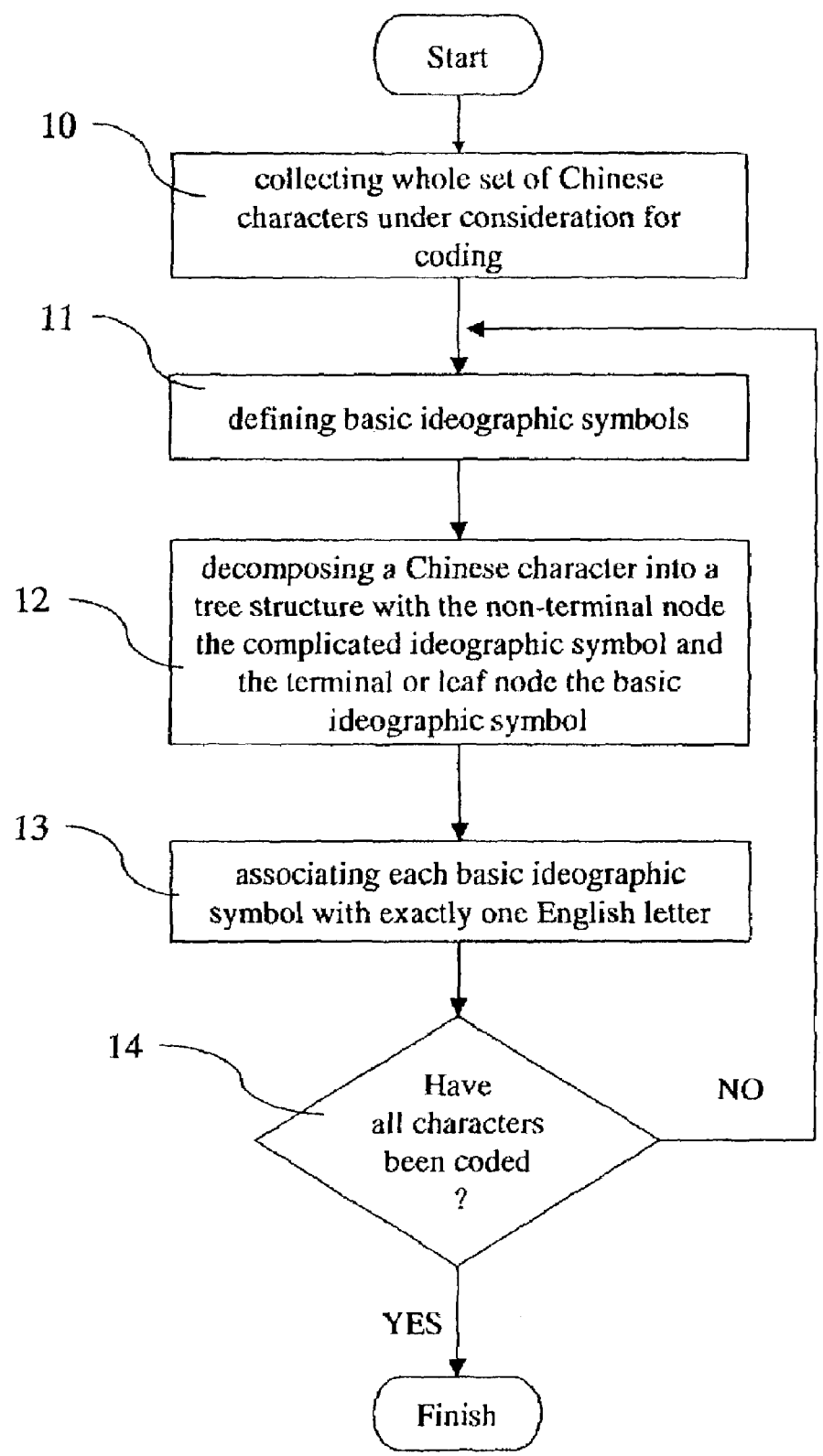
FIG. 2 is a block diagram depicting the general construction procedure of the present invention.

FIG. 2 illustrates the coding steps of the present invention. As shown in FIG. 2 block 10, the designer first prepares whole set of Chinese characters for the coding. Then, as shown in block 11, the designer begins to define a set of basic ideographic symbols. A basic ideographic symbol may be a basic stroke, a radical, or a selected component. For example, FIG. 4 Table 1 shows the set of basic ideographic symbols being defined. In the table, labels 21, 22, 23, 24, 25, 26 and 27 are basic strokes; labels 34, 35 and 36 are radicals; labels 37 and 39 are selected components.

Figure 3:
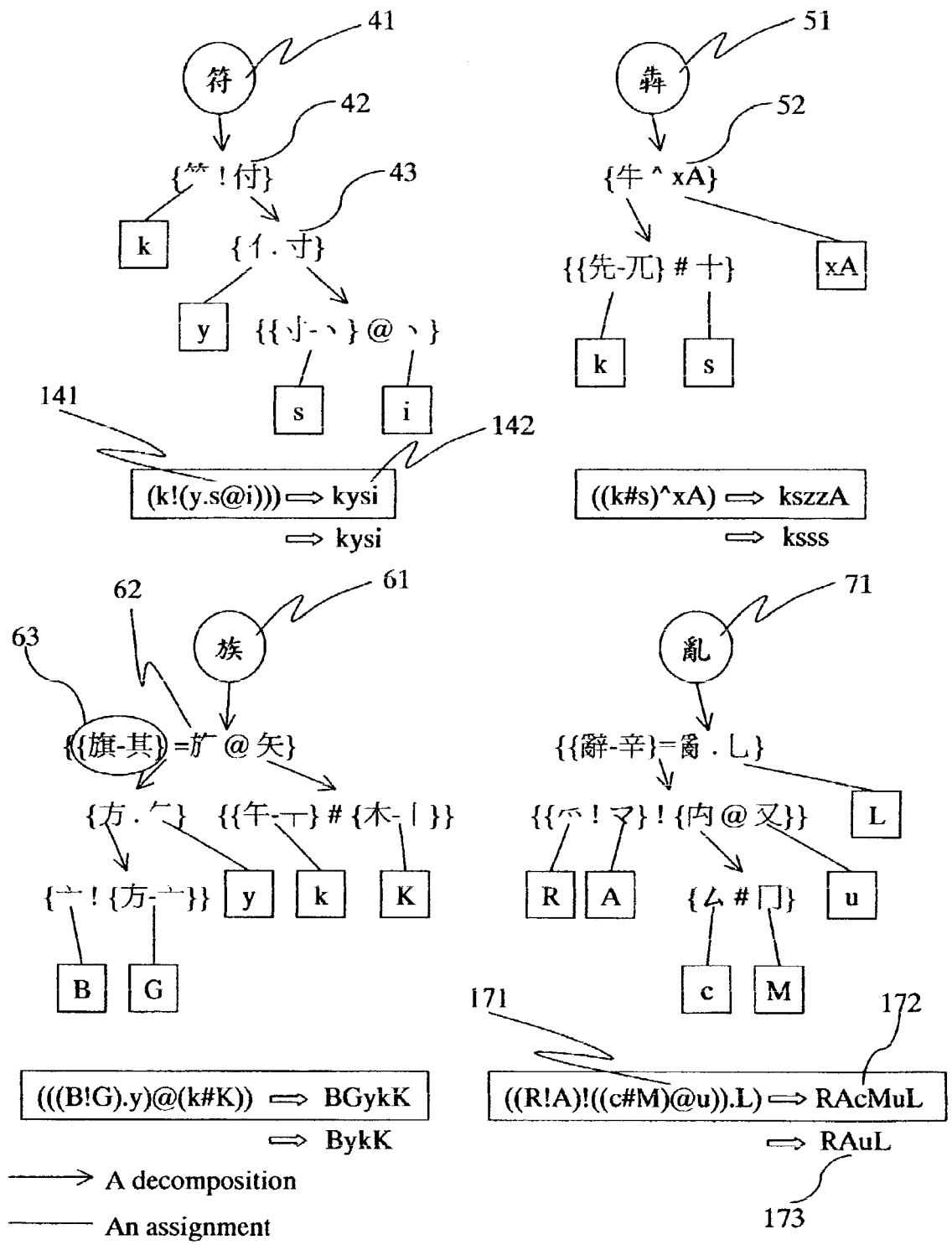
FIG. 3 depicts decomposition steps of sample Chinese characters, wherein each character is decomposed into a tree structure and coded according to infix notation of the tree structure.

In the process of defining a basic ideographic symbol, the designer begins to decompose each Chinese character into a tree structure with the non-terminal node representing the complicated ideographic symbol and the terminal or leaf node representing the basic ideographic symbol. FIG. 3 shows four examples of character decomposition. The character 41 is decomposed into vertically concatenated two ideographic symbols, one is a radical and the other is another Chinese character by itself The character 42 is further decomposed into two ideographic symbols, one is a radical and the other is another Chinese character by itself again. The character 43 is further decomposed into two ideographic symbols, one is a selected component and the other is a basic stroke. Since all of the leaf nodes are reached, no further decomposition is necessary.

The character 51 is decomposed into a character and a symbol 52 to indicate repetition of the character in a triangular shape similar to A. The character 61 is decomposed into two parts. The left part is a complicated ideographic symbol and the right one is a character by itself The complicated ideographic symbol 62 can be represented by the difference of two Chinese characters shown in label 63.

Once the basic ideographic symbols are completely defined, then, as shown in FIG. 2 block 13, the designer can associate each of the basic ideographic symbols with an English letter. Generally, the assignment of a basic ideographic symbol to an English letter is made according to the comparison of either shape, or sound, or common sense, or meaning between the basic ideographic symbol and the English letter so that the decomposition of characters can be easily memorized and identified directly from the English letters. For example, as shown in FIGS. 4a and 4b, Table 1, the basic ideographic symbol labeled 26 is a basic stroke, which is assigned to the letter p is based on the similarity of sound in their pronunciation of Chinese and English phonemes. The other basic strokes are assigned to the letters: i, N, I, j, v, and r, respectively. The radical 35 assigned to the English letter g is based on the first letter spelling connection to the English word for "gold", which is the meaning of the radical. The selected component 37 is assigned to the letter F is based on the similarity of their appearances. The radical 131 means illness in Chinese, and, therefore, the radical associated with the letter N is based on the connection to the common sense of saying "No to diseases". As depicted in FIG. 2, block 14 checks if all characters in the set are represented by at least one English letter. If not, then the decomposition process is repeated until the condition is met.

An operator is defined when, in character decomposition, there exists separation into two parts. Specifically, there are six types of operators to decompose a character or a complicated ideographic symbol into separable two parts in vertical, horizontal, surrounded, repeated, bound, and connected forms. These six operator types are indicated by the symbols !, ., @, ^, \ or /, and #, respectively. Generally, a type of operator to decompose a character can be instantly determined by the appearance of the character or the way it is written. FIG. 5, Table 2, shows some examples of decomposing characters or complicated ideographic symbols into separable two parts. In the table, column 91 contains characters or complicated ideographic symbols to be decomposed into two parts: the front part in column 92, the rear part in column 94, and the type of operators in column 93. For example, the character 191 in column 91 is decomposed into two parts by a vertical operator as indicated in column 93: the front part in column 92 is a complicated ideographic symbol and the rear part in column 94 is a character by itself Similarly, the character 192 is separated by a horizontal operator, the complicated ideograph symbol 193 by a surrounding operator, the character 194 by a repetitive operator, the complicated ideograph symbol 195 by a bound operator, and the character 196 by a connected operator.

This Chinese character coding method is collision free if each character code is coded according to the complete structure of its decomposition tree. In FIG. 3, for example, label 141 has a unique infix notation "(k!(y.s@i)))" obtained from traversing the decomposition tree of the character 41. However, the infix notation is too lengthy for coding the character. This lengthy code has to be subjected to length reduction to be useful. As shown in FIG. 3 label 142, the "kysi", is the reduced code for label 141. Similarly, FIG. 3 label 171 of the infix notation "((R!A)!((c#M)@u)).L)" of the decomposition tree of the character 71 can be reduced to "RAcMuL" (label 172) and then further reduced to a four letter code "RAuL" (label 173), by extracting the most significant letters from those letters of label 172.

The collision-free process requires knowledge of the collided characters and how collisions happen. FIGS. 6a, 6b, 6c, Table 3, shows three categories of collision. FIG. 6a, Table 3(1) shows the first category. In this category, the collision is due to the fact that two characters contain same ideographic symbols with different operators. FIG. 6b, Table 3(2) shows the second category where two collided characters contain different ideographic symbols. FIG. 6c, Table 3(3) shows the third category where the collided characters have different reduced infix notation letters.

FIG. 6a, Table 3(1) illustrates some collided characters in the first category of collision. As shown in the table, the characters 301 and 302 have the same collided code: fhK. In order to separate them to provide a collision free code, the most frequently used character 302 may retain the original code, and the letter Z is inserted or appended to the less frequently used character 301, i.e.: fhKZ to distinguish itself from the original code.

FIG. 6b, Table 3(2) illustrates the second category where the characters 401 and 402 are another pair of collided characters having the same reduced code: fhay. In order to separate their codes into collision free symbols, the most frequently used character 401 retains the original code and the letter z is appended to the less frequently used character 402, i.e.: fhayz to distinguish it from the original code. FIG. 6c, Table 3(3) illustrates the third category of collided characters. Characters 501, 502 and 503 have the same reduced code: sKTA. In order to separate their codes into collision free symbols, the most frequently used character 501 retains the original code, then the letter M is appended to the less frequently used character 502, i.e. sKTAM to distinguish it from the original code and the letter v is appended to the simplified Chinese character 503 that is used in Mainland China, i.e. sKTAv to distinguish it from the original code.

While the preferred embodiments of the invention have been illustrated and described, it will be appreciated that various changes can be made therein without departing from the spirit and scope of the invention. For example, although the method can be performed manually, it may also employ a computer system for collision-free coding of sets of Chinese or Asian characters having complicated and basic ideographic symbols. This computer system employs a computer processor into which a database of a whole set of Chinese or Asian characters under consideration for the coding analysis is inputted. An analytical computer program defining basic ideographic symbols included in the set is then inputted into the computer processor. This computer program decomposes each Chinese or Asian character into a tree structure with a non-terminal node representing the complicated ideographic symbol and its terminal or leaf nodes of representing the basic ideographic symbol in the analysis. It then associates each basic ideographic symbol with exactly one English letter by iterative repetition until all characters in the set are represented by at least one English letter. This computer system may also employ the additional steps described above to insure collision-free coding.

Although the foregoing description refers to the illustrated embodiments, it is not intended to restrict the scope of the appended claims. The claims themselves recite those features deemed essential to the invention.

I claim:

1. A computerized collision-free Chinese or Asian character coding method for representing sets Chinese or Asian characters having complicated and basic ideographic symbols comprising:
   a) collecting a whole set of Chinese or Asian characters;
   b) defining basic ideographic symbols included in the set;
   c) decomposing each Chinese or Asian character into a tree structure with non-terminal nodes representing complicated ideographic symbols and terminal or leaf nodes representing basic ideographic symbols;
   d) associating each basic ideographic symbol with exactly one English letter; and
   e) iteratively repeating steps b, c and d until all characters in the set are represented by at least one English letter.

2. A collision-free Chinese or Asian character coding method according to claim 1, wherein the defining basic ideographic symbols in the set include at least eight basic strokes 丶, 一, 丨, 丿, ✓, ′, 丿, and 乀" and some radicals selected from the group consisting of: 乙ㄗ人几入八 冂宀氵几凵刀　　　力匕匚匸十卜　　　卩厂厶又亻阝　　口囗土士夂 夕大女宀小尸巾山工幺广 廾彐廴=十扌氵阝心戈日曰月木水火灬一 宀王月辶田 疒癶目石立 氺竹竹艹糹纟虫衤礻 钅金and (81 Chinese radicals).

3. A collision-free Chinese or Asian character coding method according to claim 2, wherein the ideographic symbols are listed in the following table:

| | |
|---|---|
| A | 八, ⺌, ⼎, 𠆢, 大, 田, 丐; |
| B | 刀, ⺮, 卩, 匹, 匕, 月, 凵; |
| C | 厂, 匚, 匸, 丰, 工, 糸, 纟, 厶, 亻, 彳, 𠂉, 扎, 𠂊, 丬, 丷; |
| D | 木, 彐, 九, 尸, 工, 凵, 彐, 尹; |
| E | 王, 毛, 彐, 彐, 臣, 用, 匚, 𦍌, 刀, 厂, 二, 三, 丰; |
| F | 癶, 几, 丬, 匕, 匚, 尸, 火, 业, 氵, 灬, 厂, 广, 厂; |
| G | 勹, 力, 𠂉, 戈, 金, 刀, 𠃌, 丬, 𠂇, 𠂆, 𠃌; |
| H | 廾, 𠂉, 圡, 川, 廾, 𠂊, 丌, 廾, 巴, 𠃌, 艹, 艹, 匕, 乂; |
| I | 工, 扌, 丰, 丰, 丰, 业, 丶, 小; |
| J | 丁, 𠃌, 𠄌, 虫, 丨, 一, 巾, i; |
| K | 六, 大, 𠆢, ⼀, 丷, 灬, 𠆢, 竹, 𥫗, 千, 千, 彳, 𠂉, 𠂇, 夕, 以; |
| L | 乙, 习, 乁, 乚, 乀, 凵, 乛, 凵, 𠄌, 凵, 丨, i, 丶; |
| M | 冖, 冂, 月, 儿, 冖, 月, 勿, 月, 灬; |
| N | 广, 乙, 勹, 一, 几, 夕, 几, 𠆢, 𠂊; |
| O | 口, 艹, 口已; |
| P | 尸, 夂, 夊, 丿, 丶, 𠃊, 卩, 心, 氺, 忄; |
| Q | 日, 囗, 𡿨, 日, 白, 凹, 囗, 勹, 门, 𠆢; |
| R | 夕, ⺀, 勹, 冂, 尸, 旨, 𠂇, 儿, 几, 川, 丶; |
| S | 石, 丰, 勹, 勹, 勹, 十, 丁, 丶; |
| T | 丁, 𠂆, 𠃍, 一, 土, 土, 七, 匕; |
| U | 凵, 中, 山, 𡳿, 立, 乂, 乀, 凵; |
| V | 人, 入, 宀, 𠆢, 𠆢, 𠂊, 丷, レ, 乚, 𡿨, 女, 丄, 丶; |
| W | 水, 米, 米, 米, 一, 亻, 幺, 幺, 纟, 衤, 氺, 乂, 𠄎, 灬, 皿; |
| X | 言, 訁, 才, 大, 七, 扌, 扌, 乂, 乄; |
| Y | 卜, 卜, 𠂉, 厶, 乂, Y, ⺈, 亻, ⺈, 𠂊, 𠂉, ⼀; |

4. A collision-free Chinese or Asian character coding method according to claim 1, including the step of defining operators and operator types for character decomposition.

5. A collision-free Chinese or Asian character coding method according to claim 4, wherein the step of decomposing characters or complicated ideographic symbols into its dual nodes comprises selecting unassigned redefined operators.

6. A collision-free Chinese or Asian character coding method according to claim 4, wherein there are six types of operators comprising vertical, horizontal, surrounded, repeated, bound, and connected operators.

7. A collision-free Chinese or Asian character coding method according to claim 1, including generating a sequence of English letters to associate with a character by traversing the decomposed tree corresponding to the character.

8. A collision-free Chinese or Asian character coding method according to claim 1, including extracting from the generated sequence of English letters the most significant letters to represent the character.

9. A collision-free Chinese or Asian character coding method according to claim 1, including collecting collided characters in a table containing three categories of collision, wherein the first category contains a collision code for characters decomposed with same ideographic symbols but with different operators, the second category contains a collision code for characters having different basic ideographic symbols corresponding to same assigned English letter, and the third category contains a collision code for characters having two different reduced infix notation letters.

10. A collision-free Chinese or Asian character coding method according to claim 9, wherein code unification of the first category includes retaining the original code for the character most frequently used and inserting or appending a letter Z to the character code of the other less frequently used character.

11. A collision-free Chinese or Asian character coding method according to claim 9, wherein code unification of the second category comprises:
   a. retaining the original code for the character most frequently used; and
   b. appending for each other collided character a letter providing the most distinctive basic ideographic symbol to the character code.

12. A collision-free Chinese or Asian character coding method according to claim 11, wherein the process of appending a letter comprises inserting one extra letter Z to the character code for those collided character codes with a length less than four.

13. A collision-free Chinese or Asian character coding method according to claim 9, wherein code unification of the third category comprises retaining the original code for the character most frequently used, and appending to the other character code of the other collided character one additional letter selected from its original reduced infix notation letters.

14. A computer system for collision-free coding of sets of Chinese or Asian characters having complicated and basic ideographic symbols comprising:
   a) a computer processor;
   b) a database of a whole set of Chinese or Asian characters inputted into the computer processor;
   c) an analytical computer program defining basic ideographic symbols included in the set inputted into the computer processor for:
      i. decomposing each Chinese or Asian character into a tree structure with non-terminal nodes representing complicated ideographic symbols and terminal or leaf nodes representing basic ideographic symbols;
      ii. associating each basic ideographic symbol with exactly one English letter; and
   d) iteratively repeating step c until all characters in the set are represented by at least one English letter.

15. A tangible computer readable medium for collision-free coding of sets of Chinese or Asian characters having complicated and basic ideographic symbols, wherein the medium includes code instructions for performing the method of claim 1.

* * * * *